(12) United States Patent
Chopra et al.

(10) Patent No.: US 11,093,290 B1
(45) Date of Patent: Aug. 17, 2021

(54) BACKUP SERVER RESOURCE-AWARE DISCOVERY OF CLIENT APPLICATION RESOURCES

(71) Applicant: EMC IP Holding Company LLC, Hopkinton, MA (US)

(72) Inventors: Shelesh Chopra, Bangalore (IN); Pawan Singh, Bangalore (IN); Jayashree Radha, Bangalore (IN); Yasemin Ugur-Ozekinci, Oakville (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 16/823,536

(22) Filed: Mar. 19, 2020

(51) Int. Cl.
*G06F 9/50* (2006.01)
*G06F 9/54* (2006.01)
*G06F 11/30* (2006.01)

(52) U.S. Cl.
CPC .......... *G06F 9/5027* (2013.01); *G06F 9/5016* (2013.01); *G06F 9/542* (2013.01); *G06F 11/3006* (2013.01); *G06F 11/3072* (2013.01); *G06F 2209/503* (2013.01); *G06F 2209/508* (2013.01); *G06F 2209/5022* (2013.01)

(58) Field of Classification Search
CPC ...... G06F 9/5027; G06F 9/5016; G06F 9/542; G06F 11/3006; G06F 11/3072; G06F 2209/5022; G06F 2209/503; G06F 2209/508
See application file for complete search history.

(56) References Cited

U.S. PATENT DOCUMENTS

| 10,216,432 B1* | 2/2019 | Kulkarni | G06F 3/067 |
| 10,289,441 B1* | 5/2019 | Chopra | G06F 9/45558 |
| 2019/0044846 A1* | 2/2019 | Howard | G06F 16/9566 |

* cited by examiner

*Primary Examiner* — Sisley N Kim
(74) *Attorney, Agent, or Firm* — Dergosits & Noah LLP; Todd A. Noah

(57) ABSTRACT

Server resource-aware discovery of client application resources is described. A server requests for clients to discover their application resources. If a utilization of a server resource does not exceed a server resource utilization threshold, the server fetches a copy of a client application resource from a client at a fetch rate. If the utilization of the server resource exceeds the server resource utilization threshold, the server fetches the copy of the client application resource from the client at a lesser fetch rate.

15 Claims, 3 Drawing Sheets

BACKUP SERVER RESOURCE-AWARE DISCOVERY OF CLIENT APPLICATION RESOURCES

BACKGROUND

A data object can be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A backup/restore application can create a full backup file for a data object by backing up all of the data in the data object. A full backup file may be created at infrequent intervals and can serve as a reference point for subsequent differential backup files, incremental backup files, and/or transaction log backup files. A backup/restore application can create a differential backup file for a data object by backing up the data that has changed in the data object since the last full backup file was created for the data object. As the elapsed time increases since the most recent full backup file, the accumulated changes increase in a data object, as does the time to create a differential backup file. A backup/restore application can create an incremental backup file for a data object by backing up only data that is new or changed in the data object since the most recent previous backup file was created, which may have been a full backup file, a differential backup file, or another incremental backup file. Since an incremental backup file does not store duplicate copies of unchanged data, a system can efficiently store more backup files created at more points in time by organizing the data into increments of change between points in time. A backup/restore application can create a transaction log backup file for a data object by only backing up a history of actions executed by the data object's management system. The data object's management system can use a transaction log backup file to re-apply the changes made by committed transitions that are not materialized in a data object and roll back the changes to a data object that were made by uncommitted transactions.

A data object may be stored on a storage array, which can be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

A backup/restore application can include an application data manager that requests application data management agents on application hosts to discover the application resources that are stored on these hosts, such as discovering the application servers, the file systems, the applications, the databases, and the copy metadata of all backups on all application hosts. After discovering these application resources, the application data management agents send copies of these application resources and information about these application resources to the requesting application data manager.

DETAILED DESCRIPTION

Figure 1:
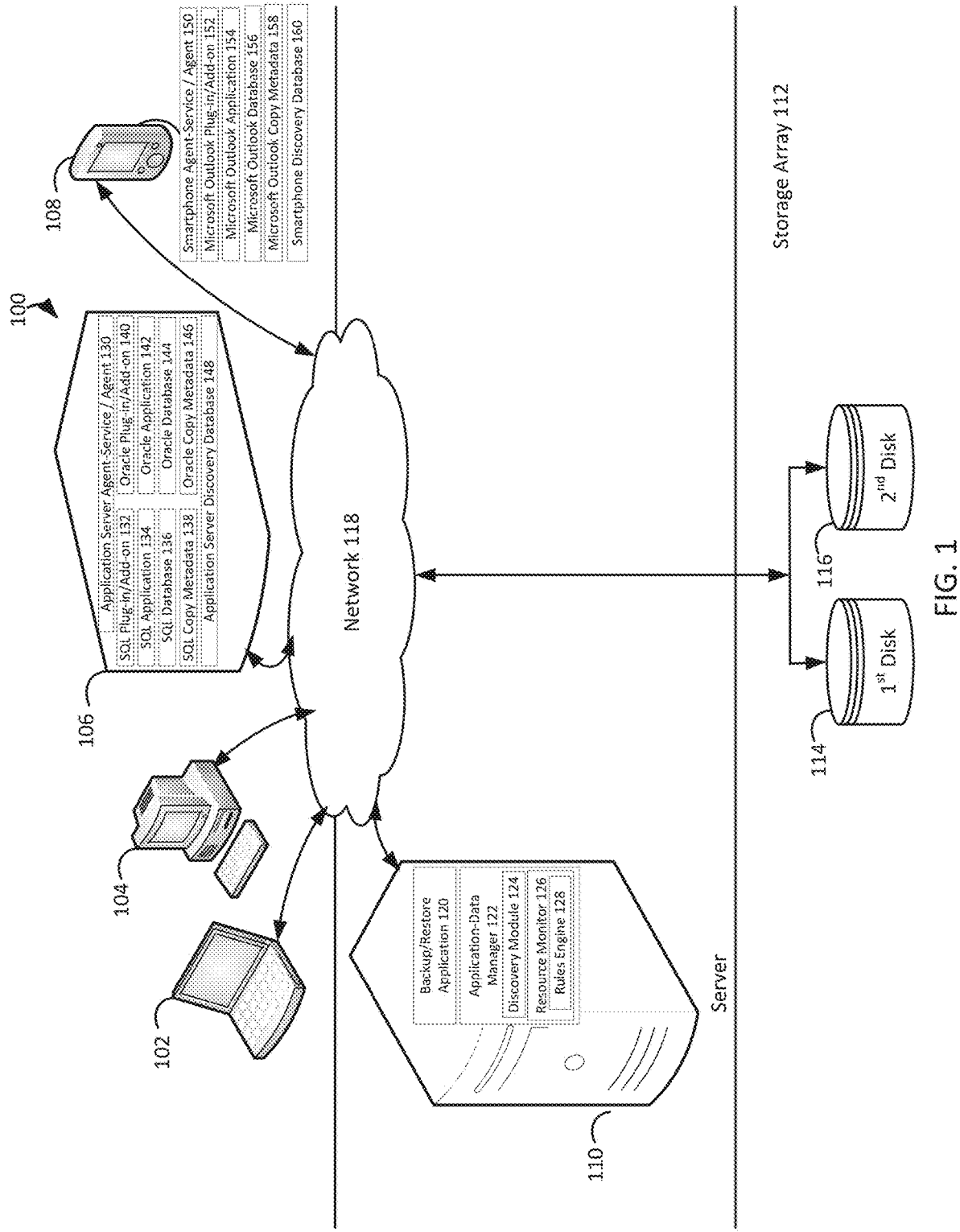
FIG. 1 illustrates a block diagram of an example system for backup server resource-aware discovery of client application resources, under an embodiment.

As the number of application resources managed by an application data manager, and the number of backup copies and their metadata that application data management agents send c to the application data manager increases, processing these copies of their application resources and information about their application resources becomes a very memory and central processing unit (CPU) intensive operation within the application data manager. Consequently, an application data manager may be restricted to servicing a limited number of application resources (for example databases), such as 2,500, because the memory in the backup server that is executing the backup/restore application may be completely filled when the application data manager receives all of the copies of the limited number of databases. The amount of the copies of the application resources grows exponentially with scale and is cumulative too, thus leading to an explosion in an application data manager's memory and CPU usage.

Embodiments herein provide backup server resource-aware discovery of client application resources. A server requests for clients to discover their application resources. A change notification can be received about a client application resource from a client. A utilization is identified of a server resource by the server. If the utilization of the server resource does not exceed a server resource utilization threshold, the server fetches a copy of the client application resource from the client at a standard fetch rate. If the utilization of the server resource exceeds the server resource utilization threshold, the server fetches the copy of the client application resource from the client at a lesser fetch rate.

For example, an application data manager's discovery module requests for multiple clients, which include an application host and a smartphone, to discover their client application resources, which include SQL, Oracle, and Microsoft® Outlook resources. The discovery module can receive change notifications for specific SQL, Oracle, and Microsoft® Outlook copy metadata from the application host and the smart phone. If the backup server's utilization of the backup server's memory is 50%, which does not exceed the backup server's memory utilization threshold of 75%, then the discovery module fetches copies of the SQL, Oracle, and Microsoft® Outlook copy metadata from the application host and the smartphone at a rate of 100-record pages per fetch. If the backup server's utilization of the backup server's memory is 80%, which exceeds the backup server's memory utilization threshold of 75%, then the discovery module fetches copies of the SQL, Oracle, and Microsoft® Outlook copy metadata from the application host and the smartphone at the reduced rate of 10-record pages per fetch, and it can even limit the number of clients where the discovery results are fetched from.

The application data manager gains control of the application resource discovery process and the amount of data that it can consume at a given time. The ability to reduce the rate of fetching discovery data at a given time when a spike in the utilization of memory or processors occurs, and subsequently increase the fetch rate when the backup server's resource utilization decreases, enables the application data manager to continue with critical workloads, such as backup or restore, without interruption.

FIG. 1 illustrates a diagram of a system 100 for backup server resource-aware discovery of client application resources, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, and a fourth client 108; and a server 110, and a storage array 112 that may be provided by a hosting company. Although FIG. 1 depicts the first client 102 as a laptop computer 102, the second client 104 as a personal computer 104, the third client 106 as an application host 106, and the fourth client 108 as a smartphone 108, each of the clients 102-108 may be any type of computer. The storage array 112 includes a first disk 114 and a second disk 116. The clients 102-108, the server 110, and the storage array 112 communicate via a network 118. Although FIG. 1 depicts the system 100 with four clients 102-108, one server 110, one storage array 112, two disks 114-116, and one network 118, the system 100 may include any number of clients 102-108, any number of servers 110, any number of storage arrays 112, any number of disks 114-116, and any number of networks 118. The clients 102-108 and the server 110 may each be substantially similar to the system 300 depicted in FIG. 3 and described below.

The server 110, which may be referred to as a backup server 110, includes a backup/restore application 120 that can create backup files of data objects for the clients 102-108, and execute a restore based on the backup files stored on the storage array 112. The backup/restore application 120 can provide centralized administration, such as scheduling, monitoring, and managing backup operations and backup files. The backup/restore application 120 can enable the storing of backup operation schedules, client policies, and client configurations. The backup/restore application 120 can provide a unique interface to the clients 102-108 during login, and also assist the backup server 110 in authenticating and registering the clients 102-108. The backup/restore application 120 can send backup/restore work orders to the clients 102-108, which can receive and process the work orders to start a backup or restore operation. The backup/restore application 120 can maintain a local database of all processes that execute on the backup server 110. The backup/restore application 120 can execute server-side processes for a system administrator's graphical management console, which may enable the system administrator to use command line interface tools for queries. For example, a system administrator identifies the clients 102-108 registered with the backup server 110.

The backup server 110 also includes an application data manager 122, which includes a discovery module 124 and a backup server resource monitor 126, which can include a rules engine 128. The backup/restore application 120 can use the application data manager 122 to backup data objects and restore data objects. As described below, the discovery module 124 can request for clients to discover their application resources and fetch copies of these discovered application resources from the clients. As described below, the backup server resource monitor 126 can use the rules engine 128 to monitor the server resource utilization by the backup server 110, and instruct the discovery module 124 to adjust the rate of fetching copies of discovered application resources based on the available server resources for the backup server 110. FIG. 1 depicts the backup/restore application 120 and the application data manager 122 residing completely on the backup server 110, but the backup/restore application 120 and/or the application data manager 122 may reside in any combination of partially on the backup server 110, partially on another server which is not depicted in FIG. 1, and partially on the clients 102-108.

Using a generic data model and discovery protocol, the application data manager 122 can discover client application resources via an application host agent-service which can generically use an add-on to discover data for different client application resources on the clients 102-108. Alternatively, using application vendor-specific logic, the application data manager 122 can discover client application resources via an application host agent which can use a vendor-specific plug-in to discover different client application resources and their backup copies on the clients 102-108. Therefore, the application data manager 122 can discover client application resources via an application host agent-service or service 130 which can use a SQL Plug-in or Add-on 132 and an Oracle Plug-in or Add-on 140 to discover data for client application resources on the application host 106, and discover client application resources via a smartphone agent-service or service 150 which can use a Microsoft Outlook Plug-in or Add-on or 152 to discover data for client application resources on the smartphone 108.

In an example using the generic data model, after registering the application host 106, the application data manager 122 can discover client application resources on the application host 106 via the application host agent-service 130 which can use the Add-on 132 to discover data for a SQL application 134, a SQL database 136, and SQL copy metadata 138. In another example using the generic data model, after registering the application host 106, the application data manager 122 can discover client application resources on the application host 106 via the application host agent-service 130 which can use the Add-on 140 to discover data for an Oracle application 142, an Oracle database 144, and Oracle copy metadata 146. In yet another example using the generic data model, after registering the smartphone 108, the application data manager 122 can discover client application resources on the smartphone 108 via the smartphone agent-service 150 which can use the Add-on 152 to discover data for a Microsoft® Outlook application 154, a Microsoft® Outlook database 156, and Microsoft® Outlook copy metadata 158.

In an example using the application vendor-specific logic, after registering the application host 106, the application data manager 122 can discover client application resources on the application host 106 via the application host agent 130 which can use the SQL Plug-in 132 to discover data for the SQL application 134, the SQL database 136, and the SQL copy metadata 138. In another example using the application vendor-specific logic, after registering the application host 106, the application data manager 122 can discover client application resources on the application host 106 via the application host agent 130 which can use the Oracle Plug-in 140 to discover data for the Oracle application 142, the Oracle database 144, and the Oracle copy metadata 146. In yet another example using the application vendor-specific logic, after registering the smartphone 108, the application data manager 122 can discover client application resources on the smartphone 108 via the smartphone agent 150 which can use the Microsoft® Outlook Plug-in 152 to discover data for the Microsoft® Outlook application 154, the Microsoft® Outlook database 156, and the Microsoft® Outlook copy metadata 158.

The application host agent-service or agent 130 may store its discovered data in an agent/agent service discovery database 148. The smartphone agent-service or agent 150 may store its discovered data in a smartphone discovery database 160. Although FIG. 1 depicts the system 100 with four clients 102-108 that communicate via two agent-services or agents 130 and 150 which use three Add-ons or Plug-ins 132, 140, and 152 to discover application resources for three applications 134, 142, and 154 and store discovered data in two discovery databases 148 and 160, the system 100 may include any number of clients 102-108 that communicate via any number of agent-services or agents 130 and 150, which use any number of Add-ons or Plug-ins 132, 140, and 152 to discover application resources for any number of applications 134, 142, and 154 and store discovered data in any number of discovery databases 148 and 160.

Although the following paragraphs describe Dell Corporation's PowerProtect® backup/restore application, Dell-Corporation's NetWorker® backup/restore application, and Dell Corporation's Avamar® backup/restore application as examples of the backup/restore application 120, the backup/restore application 120 may be any other type of backup/restore application which provides the backup/restore functionalities described in the Background section. Even though the following paragraphs describe Dell Corporation's Data Domain as an example of the backup server 110, the backup server 110 may be any other type of backup server which provides the backup/restore functionalities described in the Background section.

The backup/restore application 120 may be an Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances. When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 120 may be an Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 120 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The backup server 110 may be an Dell Corporation's Data Domain server. The Data Domain operating system delivers scalable, high-speed, and cloud-enabled protection storage for backup, archive, and disaster recovery. Data Domain employs variable-length deduplication to minimize disk requirements and to ensure data lands on a disk that is already deduplicated, thereby reducing backup and archive storage requirements, and making disk a cost-effective alternative to tape. Deduplicated data may be stored onsite, for immediate restores and longer-term retention on disk, and replicated over a wide area network to a remote site or a service provider site in the cloud for disaster recovery operations, eliminating the need for tape-based backups or for consolidating tape backups to a central location. Data Domain provides the capability to consolidate both backup and archive data on the same infrastructure, thereby eliminating silos of backup and archive storage and associated overhead. Inline write and read verification protects against and automatically recovers from data integrity issues during data ingest and fetch. Capturing and correcting I/O errors inline during the backup and archiving process eliminates the need to repeat backup and archive jobs, ensuring backups and archiving complete on time and satisfy service-level agreements. In addition, unlike other enterprise arrays or file systems, continuous fault detection and self-healing ensures data remains recoverable throughout its lifecycle on Data Domain. End-to-end data verifications reads data after it is written and compares it to what was sent to disk, proving that it is reachable through the file system to disk and that the data is not corrupted.

The backup server 110 executes the discovery module 124 in the application data manager 122, which requests the agent-services or agents 130 and 150 that are executing on the clients 102-108, which may be referred to as the hosts 102-108, to discover the clients' application resources. Examples of the clients' application resources include the application host 106, the smartphone 108, the applications 134, 142, and 154, the databases 136, 144, and 156, and the copy metadata 138, 146, and 158 of all backups in the clients 102-108. For example, the discovery module 124 makes REST (Representational State Transfer) application programming interface calls to request for the agent-services or agents 130 and 150 to discover their client application resources. When requesting the discovery of client application resources, the discovery module 124 can send the agent-services or agents 130 and 150 the last updated time stamp for each application resource for which the discovery module 124 previously fetched a copy. Upon receipt of the last updated time stamps for each application resource for which copies were previously fetched, the agent-services or agents 130 and 150 subscribe the discovery module 124 to receive a change notification for the currently discovered application resources that were added, modified, or deleted after their last updated time stamp, and any currently discovered application resources which do not correspond to a last updated time stamp. Consequently, the agent-services or agents 130 and 150 only inform the discovery module 124 about client application resources which had not been previously discovered, rather than informing the discovery module 124 about the discovery of client application resources which the discovery module 124 has already fetched. In some embodiments, the discovery module 124 can use one component for discovering application resources other than copies of metadata, such as the databases 136, 144, and 156, and use another component dedicated to discovering copies of metadata, such as the copy metadata 138, 146, and 158.

A server can be a computer that executes computer programs which share their computer program resources and/or services with client devices. A client can be a computer that provides access to a database or any other service. A client application resource can be a valuable thing used by a program that executes a particular task on a computer that provides access to a database or other service. An application programming interface can be a set of clearly defined methods of communication between various software components. An agent can be a computer program designed to automate certain tasks, such as gathering information. An agent-service can be the providing of computer programs designed to automate certain tasks, such as gathering information.

After receiving the discovery change notification subscription or direct discovery requests from the application data manager's discovery module 124, the agent-services or agents 130 and 150 respond by discovering the client application resources 134-138, 142-146, and 154-158 on the clients 102-108 and storing copies of the discovered application resources 134-138, 142-146, and 154-158 in the discovery databases 148 and 160, which may be implemented as SQLite databases 148 and 160. Alternatively, the agent-services or agents 130 and 150 can independently discover the client application resources 134-138, 142-146, and 154-158 on the clients 102-108, without having received any discovery change notification subscription or direct discovery requests from the application data manager's discovery module 124. In this way, the agent-services or agents 130 and 150 are resilient to transient issues, such as application data manager unavailability or a network error on the system 100, and can still store copies of the discovered application resources 134-138, 142-146, and 154-158 in the discovery databases 148 and 160. The agent-services or agents 130 and 150 can compare the last updated time stamps for previously fetched copies of client application resources to the corresponding timestamps for each currently discovered application resource and store in the discovery databases 148 and 160 only the copies of the currently discovered application resources, which were added, modified, or deleted after their last updated time stamp or which did not correspond to a previous time stamp. For example, the application host agent-service or agent 130 receives the time stamp of one year ago for the previously fetched copy of the SQL application 134 and the time stamp of one hour ago for the previously fetched copy of the SQL copy metadata 138 from the discovery module 124. The application host agent-service or agent 130 discovers SQL resources, compares the time stamps received from the discovery module 124 to the timestamp of one year ago for the currently discovered SQL application 134 and the time stamp of 1 minute ago for the currently discovered SQL copy metadata 138. The application host agent-service 130 stores a copy of the currently discovered SQL copy metadata 138 in the SQLite databases 148, because the SQL copy metadata 138 is a discovered application resource that was added, modified, or deleted after its time stamp that was received from the discovery module 124, and sends a change notification for the SQL copy metadata 138 to the discovery module 124. A time stamp can be a digital record of when a particular event occurred. A fetched copy can be a retrieved duplicate of an entity. A change notification can be the act of informing about a modification of an entity.

Concurrent with the discovery module 124 requesting the agent-services or agents 130 and 150 to discover their application resources, and with the agent-services or agents 130 and 150 discovering their application resources, the backup server resource monitor 126 monitors the CPUs and memory that are available for the discovery module 124, along with the jobs being executed by or pending execution by the backup server 110, which identifies the current utilization of server resources by the backup server 110. For example, the backup server resource monitor 126 identifies that the backup server 110 which is executing the application data manager 122 is currently utilizing 50% of the backup server's memory. In an alternative example, the backup server resource monitor 126 identifies that the backup server 110 which is executing the application data manager 122 is currently utilizing 80% of the backup server's memory.

A utilization can be the action of making an effective use of a backup server resource. A server resource can be an asset for a computer that runs computer programs which share their computer program resources or services with client devices. A central processing unit can be a part of a computer in which operations are controlled and executed. A memory can be a physical device capable of storing information temporarily or persistently for a computer. A job can be an operation or group of operations treated as a single and distinct unit. Pending execution can be an instruction or program that is waiting for performance.

Having identified the current utilization of the backup server's resources, the backup server resource monitor 126 determines whether the utilization of the backup server's resources exceeds any backup server resource utilization thresholds, which can occur during peak workloads. For example, the backup server resource monitor 126 determines whether the 50% utilization of the backup server's memory exceeds the backup server's memory utilization threshold of 75%. In an alternative example, the backup server resource monitor 126 determines whether the 80% utilization of the backup server's memory exceeds the backup server's memory utilization threshold of 75%. A server resource utilization threshold can be the magnitude that must be exceeded by an effective use of an asset for a computer that runs computer programs, which shares their computer program resources and/or services with client devices, for a certain reaction to occur.

If the utilization of the backup server's resources does not exceed any of the backup server's resource utilization thresholds, then the backup server fetches copies of the client application resources from the clients at a standard fetch rate. For example, since the backup server's 50% utilization of its memory does not exceed its memory utilization threshold of 75%, and the discovery module 124 received a change notification for the SQL, Oracle, and Microsoft® Outlook copy metadata. the discovery module 124 issues REST application programming interface calls to the agent-services or agents 130 and 150 to fetch copies of the SQL, Oracle, and Microsoft® Outlook copy metadata. 138, 146, and 158 at the default rate of 100-record pages per fetch. Since the discovery module 124 received a change notification for specific client application resources. the discovery module 124 issues REST application programming interface calls to the agent-services or agents 130 and 150 to fetch only the copies of the specific client application resources, rather than issuing REST application programming interface calls to the agent-services or agents 130 and 150 to fetch the copies of all client application resources. A copy can be a duplicate of an entity. A fetch rate can be a measure of retrieving an entity, typically compared against another measure of retrieving another entity.

If the backup server resource monitor 126 determines that the backup server's memory or CPU utilization is greater than the backup server's corresponding backup server resource utilization thresholds, then the backup server resource monitor 126 informs the application data manager 122 to reduce the fetch rate of the copies of the client application resources, and the backup server 110 fetches copies of the client application resources from the clients 102-108 at a reduced fetch rate. The application data manager 122 can reduce the fetch rate of the copies of the client application resources from the clients 102-108 by either reducing the size of the fetched pages of copies of the client application resources from the clients 102-108, thereby fetching only a subset of the amount of the copies that would have been fetched during any single fetch operation, or by pausing the fetching of the copies of the client application resources from the clients 102-108. A subset can be a part of a larger group of related things.

For example, if the backup server's 80% utilization of its memory exceeds its memory utilization threshold of 75%, and the discovery module 124 received a change notification for the SQL, Oracle, and Microsoft® Outlook copy metadata 138, 146, and 158, then the discovery module 124 issues REST application programming interface calls to the agent-services or agents 130 and 150 and fetches copies of the SQL, Oracle, and Microsoft® Outlook copy metadata 138, 146, and 158 at the reduced rate of 10 records per pages for each fetch. Since the discovery module 124 received a change notification for specific client application resources. the discovery module 124 issues REST application programming interface calls to the agent-services or agents 130 and 150 to fetch only the copies of the specific client application resources, rather than issuing REST application programming interface calls to the agent-services or agents 130 and 150 to fetch the copies of all client application resources. The application data manager 122 can maintain the reduced fetch rate until the backup server resource monitor 126 determines that the utilization of the backup server's resources no longer exceeds any of their backup server resource utilization thresholds and sends a "resume the normal fetch rate" signal to the application data manager 122. Continuing this example, if the backup server's 80% utilization of its memory drops below its memory utilization threshold, of 75%, then the discovery module 124 fetches the remaining un-fetched copies of the SQL, Oracle, and Microsoft® Outlook copy metadata 138, 146, and 158 at the default rate of 100 records per pages for each fetch.

Although examples describe the discovery module 124 comparing the utilization of one backup server resource against one threshold and then fetching discovery data at two rates that are based on the comparisons. the backup server resource monitor 126 can compare the utilization of any number of backup server resources against any number of thresholds and then fetch discovery data at any number of rates that are based on any number of comparisons. While examples describe the discovery module 124 comparing the utilization of a backup server resource against a threshold at one point in time and then fetching discovery data at a different rate that is based on the comparison at the one point in time. the backup server resource monitor 126 can compare the utilization of a backup server resource against a threshold at any number of points in time, and then fetch discovery data at different rates that are based on the comparisons at multiple points in time. For example, the backup server resource monitor 126 identifies the backup server's 80% utilization of its memory exceeding its memory utilization threshold of 75% for 5 consecutive seconds before informing the discovery module 124 to fetch the discovery data at the reduced rate of 10 records per pages for each fetch. In another example, the backup server resource monitor 126 identifies the backup server's 80% utilization of its memory drops below its memory utilization threshold of 75% for at least 5 seconds during 10 consecutive seconds before informing the discovery module 124 to fetch the discovery data at the normal rate of 100 records per pages for each fetch.

In an example of pausing the fetching, if the backup server's 80% utilization of its memory exceeds its memory utilization threshold, of 75%, and the discovery module 124 received a change notification for the SQL, Oracle, and Microsoft® Outlook copy metadata 138, 146, and 158. then the discovery module 124 pauses before issuing any REST application programming interface calls to the agent-services or agents 130 and 150. Continuing this example, the discovery module 124 pauses until the backup server's 80% utilization of its memory drops below its memory utilization threshold, of 75%, before issuing any REST application programming interface calls to the agent-services or agents 130 and 150. Then the discovery module 124 can fetch the copies of the SQL, Oracle, and Microsoft® Outlook copy metadata 138, 146, and 158 on the clients 102-108 at the normal rate of 100 records per pages for each fetch, or at a transition rate of 50 records per pages for each fetch, and subsequently at the normal rate of 100 records per pages for each fetch.

The backup server resource monitor 126 includes the rules engine 128 which checks the jobs that are currently executing or pending execution by the application data manager 122, the backup server resource utilization values, and the backup server resource utilization thresholds to determine if the fetch rate of discovered data should be reduced from normal fetch rates or increased from reduced fetch rates. For example, even though the backup server's 80% utilization of its memory exceeds its memory utilization threshold of 75%, the discovery module 124 fetches copies of client application resources at the normal rate of 100-record pages per fetch because the rules engine 128 determines that reduction in the fetch rate is not required since the application data manager 122 is not executing or pending execution of any backup or restore jobs.

In the prior art, if the backup server utilized 80% of the backup server's memory, the agents 130 and 150 would have pushed bulk data that includes the copies of all of the client application resources 134-138, 142-146, and 154-158 to the discovery module 124 to complete the discovery of the application resources, even though the backup server's limited memory capacity to receive the bulk data could threaten the uninterrupted execution of critical workloads, such as backup or restore operations. The application data manager 122 gains control of the application resource discovery process and the amount of data that it can consume at a given time. The ability to reduce the fetch rate of discovery data at a given time when there is a spike in the utilization of memory or processors, and subsequently increase the fetch rate when the backup server's resource utilization decreases, enables the application data manager 122 to continue with critical workloads, such as backup or restore, without interruption.

Figure 2:
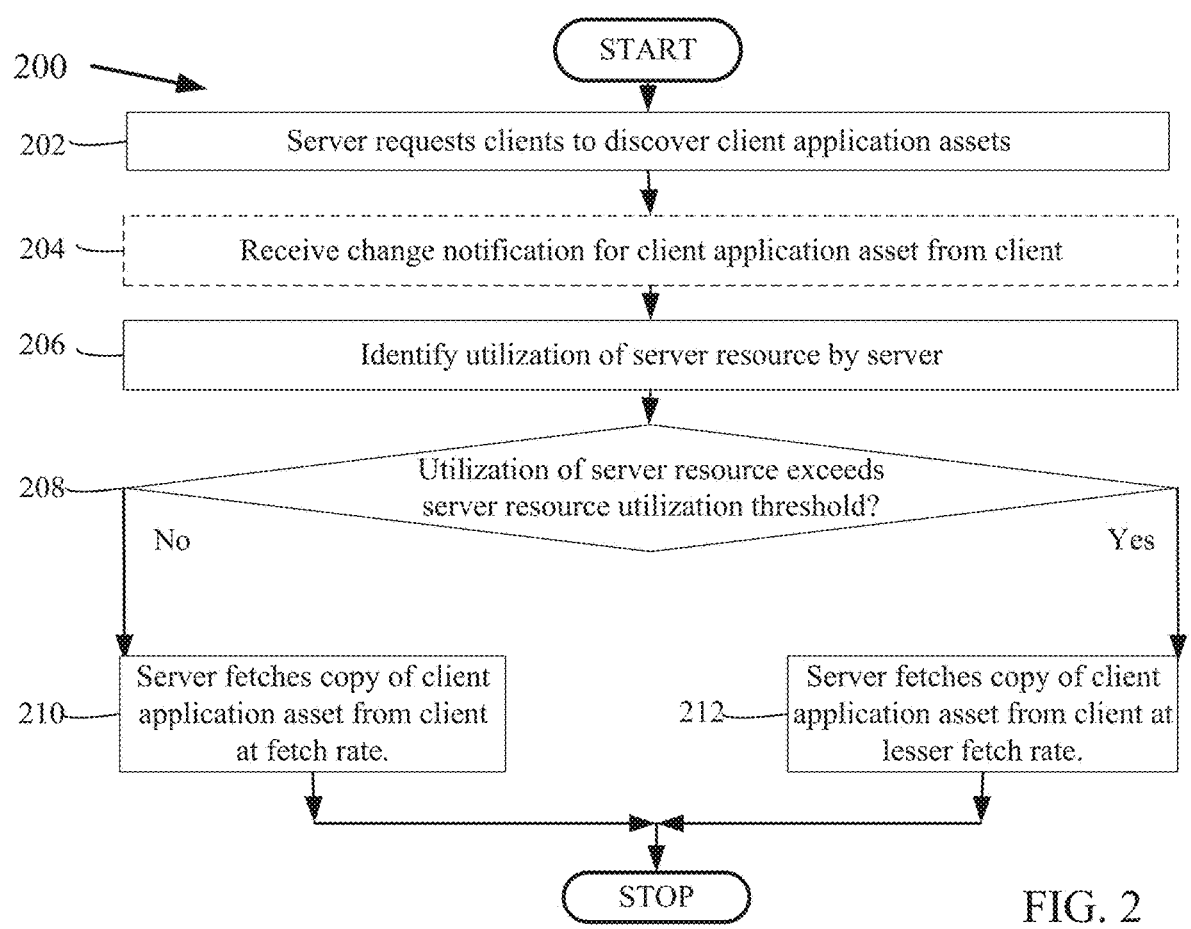
FIG. 2 is a flowchart that illustrates a method of backup server resource-aware discovery of client application resources under an embodiment.

FIG. 2 is a flowchart that illustrates a method for backup server resource-aware discovery of client application resources, under an embodiment. Flowchart 200 illustrates method acts illustrated as flowchart blocks for certain steps involved in and/or between the clients 102-108 and/or the backup server 110 of FIG. 1.

A server requests for clients to discover their client application resources, block 202. The system initiates the discovery of clients' application resources. For example, and without limitation, this can include the discovery module 124 making REST application programming interface calls requests for the agent-services or agents 130 and 150 to discover their client application resources.

After requesting discovery of client application resources, a change notification is optionally received for a client application resource from a client, block 204. The system can be notified when a client application resource has changed, so that its copy can be fetched. By way of example and without limitation, this can include the discovery module 124 receiving a change notification for the SQL, Oracle, and Microsoft® Outlook copy metadata 138, 146, and 158.

In addition to requesting discovery of client application resources, utilization is identified of a server resource by a server, block 206. The system identifies the utilization of backup server resources that are used for fetching discovered client application resources. In embodiments, this can include the backup server resource monitor 126 identifying that the backup server 110 which is executing the application data manager 122 is currently utilizing 50% of the backup server's memory. In an alternative example, the backup server resource monitor 126 identifies that the backup server 110 which is executing the application data manager 122 is currently utilizing 80% of the backup server's memory.

Following the identification of the utilization of server resources, a determination is made whether the utilization of server resource exceeds a server resource utilization threshold, block 208. The system determines whether the available backup server resources are sufficient for the normal fetch rate of copies of client application resources. For example, and without limitation, this can include the backup server resource monitor 126 determining whether the 50% utilization of the backup server's memory exceeds the backup server's memory utilization threshold of 75%. In an alternative example, the backup server resource monitor 126 determines whether the 80% utilization of the backup server's memory exceeds the backup server's memory utilization threshold of 75%. If the utilization of a backup server resource does not exceed its backup server resource utilization threshold, then the method 200 continues to block 210 to fetch copies of client application resources from clients at a normal fetch rate. If the utilization of a backup server resource exceeds its backup server resource utilization threshold, then the method 200 proceeds to block 212 to fetch copies of client application resources from clients at a reduced fetch rate.

If the utilization of a server's resource does not exceed its server resource utilization threshold, then the server fetches copies of client application resources from the clients at a standard fetch rate, block 210. The system uses the normal fetch rate to fetch copies of client application resources from clients because the available backup server resources are sufficient to support the normal fetch rate. By way of example and without limitation, this can include the discovery module 124 issuing REST application programming interface calls to the agent-services or agents 130 and 150 to fetch the copies of the SQL, Oracle, and Microsoft® Outlook copy metadata 138, 146, and 158 at the rate of 100-record pages per fetch, because the backup server's 50% utilization of its memory does not exceed its memory utilization threshold of 75%, and the discovery module 124 received a change notification for the SQL, Oracle, and Microsoft® Outlook copy metadata 138, 146, and 158.

If the utilization of a server's resource exceeds its server resource utilization threshold, then the server fetches copies of client application resources from the clients at a lesser fetch rate, block 212. The system reduces the normal fetch rate to fetch copies of client application resources from clients because the limited availability of backup server resources is insufficient to support the normal fetch rate. In embodiments, this can include the discovery module 124 issuing REST application programming interface calls to the agent-services or agents 130 and 150 and fetching the copies of the SQL, Oracle, and Microsoft® Outlook copy metadata 138, 146, and 158 at the reduced rate of 10 records per pages for each fetch, because the backup server's 80% utilization of its memory exceeds its memory utilization threshold, of 75%, and the discovery module 124 received a change notification for the SQL, Oracle, and Microsoft® Outlook copy metadata 138, 146, and 158. Alternatively, or additionally, if the utilization of a backup server's resource exceeds its backup server resource utilization threshold, then the backup server can limit the number of clients from which to fetches copies of client application resources, such as a single client. Consequently, the fetch rate could be higher on the limited number of clients from which the backup server is still fetching than the fetch rate was on the original number of clients from which the backup server was previously fetching. In such a situation, the fetch rate for the limited number of clients can depend on the relative size of the limited number of clients compared to the original number of clients, the load on the backup server, and the calculation of the required change in the standard fetch rate.

Although FIG. 2 depicts the blocks 202-212 occurring in a specific order, the blocks 202-212 may occur in another order. In other implementations, each of the blocks 202-212 may also be executed in combination with other blocks and/or some blocks may be divided into a different set of blocks.

Figure 3:
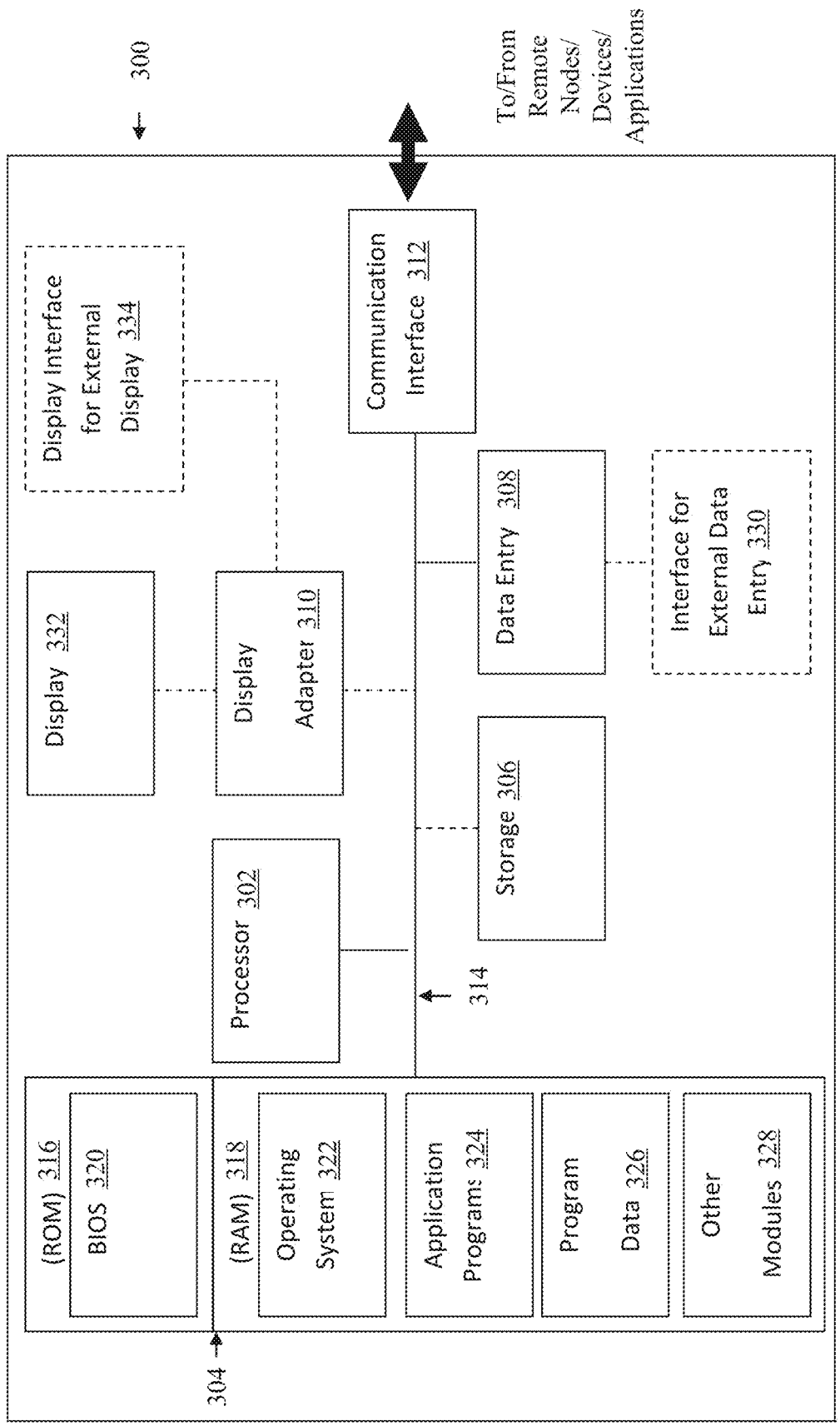
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for server resource-aware discovery of client application resources, comprising:
   one or more processors; and
   a non-transitory computer readable medium storing a plurality of instructions, which
   when executed, cause the one or more processors to:
   request, by a server, a plurality of clients, comprising a client, to discover a plurality of client application resources, comprising a client application resource;
   identify a utilization of a server resource by the server;
   determine whether the utilization of the server resource exceeds a server resource utilization threshold;
   fetch, by the server, a copy of the client application resource from the client at a first fetch rate, in response to a determination that the utilization of the server resource does not exceed the server resource utilization threshold; and
   fetch, by the server, the copy of the client application resource from the client at a second fetch rate, which is less than the first fetch rate, in response to a determination that the utilization of the server resource exceeds the server resource utilization threshold, wherein fetching at the second fetch rate comprises one of fetching a subset of the copy of the client application resources during each fetch or pausing the fetching of the copy of the client application resource, until a subsequent determination that the utilization of the server resource does not exceed the server resource utilization threshold.

2. The system of claim 1, wherein requesting the plurality of clients to discover the plurality of client application resources comprises making a plurality of application programming interface calls that request a plurality of agents corresponding to the plurality of clients to discover the plurality of client application resources, and providing a time stamp corresponding to a fetched copy of a client application resource.

3. The system of claim 1, wherein the plurality of instructions further causes the processor to receive a change notification for the client application resource from the client, wherein fetching the copy of the client application resource from the client is in response to receiving the change notification for the client application resource from the client.

4. The system of claim 1, wherein the utilization of the server resource comprises a use of at least one of a central processing unit and a memory associated with the server.

5. The system of claim 1, wherein determining whether the utilization of the server resource exceeds the server resource utilization threshold is based on at least one of a job that is executing on the server and a job that is pending execution on the server.

6. A computer-implemented method for server resource-aware discovery of client application resources, the computer-implemented method comprising:
   requesting, by a server, a plurality of clients, comprising a client, to discover a plurality of client application resources, comprising a client application resource;
   receiving a change notification for a client application resource of the plurality of client resources from a client of the plurality of clients;
   identifying a utilization of a server resource by the server;
   determining whether the utilization of the server resource exceeds a server resource utilization threshold;
   fetching, by the server, a copy of the client application resource from the client at a first fetch rate, in response to a determination that the utilization of the server resource does not exceed the server resource utilization threshold; and
   fetching, by the server, the copy of the client application resource from the client at a second fetch rate, which is less than the first fetch rate, in response to a determination that the utilization of the server resource exceeds the server resource utilization threshold, wherein fetching at the second fetch rate comprises one of fetching a subset of the copy of the client application resources during each fetch or pausing the fetching of the copy of the client application resource, until a subsequent determination that the utilization of the server resource does not exceed the server resource utilization threshold.

7. The computer-implemented method of claim 6, wherein requesting the plurality of clients to discover the plurality of client application resources comprises making a plurality of application programming interface calls that request a plurality of agents corresponding to the plurality of clients to discover the plurality of client application resources, and providing a time stamp corresponding to a fetched copy of a client application resource.

8. The computer-implemented method of claim 6, wherein the computer-implemented method further comprises receiving a change notification for the client application resource from the client, wherein fetching the copy of the client application resource from the client is in response to receiving the change notification for the client application resource from the client.

9. The computer-implemented method of claim 6, wherein the utilization of the server resource comprises a use of at least one of a central processing unit and a memory associated with the server.

10. The computer-implemented method of claim 6, wherein determining whether the utilization of the server resource exceeds the server resource utilization threshold is based on at least one of a job that is executing on the server and a job that is pending execution on the server.

11. A computer program product, comprising a non-transitory computer-readable medium having a computer-readable program code embodied therein to be executed by one or more processors, the program code including instructions to:
   request, by a server, a plurality of clients, comprising a client, to discover a plurality of client application resources, comprising a client application resource;
   receive a change notification for a client application resource of the plurality of client resources from a client of the plurality of clients;
   identify a utilization of a server resource by the server;
   determine whether the utilization of the server resource exceeds a server resource utilization threshold;
   fetch, by the server, a copy of the client application resource from the client at a first fetch rate, in response to a determination that the utilization of the server resource does not exceed the server resource utilization threshold; and
   fetch, by the server, the copy of the client application resource from the client at a second fetch rate, which is less than the first fetch rate, in response to a determination that the utilization of the server resource exceeds the server resource utilization threshold, wherein fetching at the second fetch rate comprises one of fetching a subset of the copy of the client application resources during each fetch or pausing the fetching of the copy of the client application resource, until a subsequent determination that the utilization of the server resource does not exceed the server resource utilization threshold.

12. The computer program product of claim 11, wherein requesting the plurality of clients to discover the plurality of client application resources comprises making a plurality of application programming interface calls that request a plurality of agents corresponding to the plurality of clients to discover the plurality of client application resources, and providing a time stamp corresponding to a fetched copy of a client application resource.

13. The computer program product of claim 11, wherein the program code includes further instructions to receive a change notification for the client application resource from the client, wherein fetching the copy of the client application resource from the client is in response to receiving the change notification for the client application resource from the client.

14. The computer program product of claim 11, wherein the utilization of the server resource comprises a use of at least one of a central processing unit and a memory associated with the server.

15. The computer program product of claim 11, wherein determining whether the utilization of the server resource exceeds the server resource utilization threshold is based on at least one of a job that is executing on the server and a job that is pending execution on the server.

* * * * *